(12) United States Patent
Wang et al.

(10) Patent No.: US 10,447,790 B2
(45) Date of Patent: Oct. 15, 2019

(54) INFORMATION PUSH

(71) Applicant: Alibaba Group Holding Limited, Grand Cayman (KY)

(72) Inventors: Sen Wang, Zhejiang (CN); Yunjiao Yao, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 218 days.

(21) Appl. No.: 15/624,089

(22) Filed: Jun. 15, 2017

(65) Prior Publication Data

US 2017/0289280 A1  Oct. 5, 2017

Related U.S. Application Data

(63) Continuation of application No. PCT/CN2015/096799, filed on Dec. 9, 2015.

(30) Foreign Application Priority Data

Dec. 19, 2014 (CN) .......................... 2014 1 0804531

(51) Int. Cl.
  *G06F 15/16* (2006.01)
  *H04L 29/08* (2006.01)
  *H04W 4/021* (2018.01)

(52) U.S. Cl.
  CPC .............. *H04L 67/18* (2013.01); *H04L 67/26* (2013.01); *H04W 4/021* (2013.01)

(58) Field of Classification Search
  CPC ......... H04L 67/18; H04L 67/26; H04W 4/021
  (Continued)

(56) References Cited

U.S. PATENT DOCUMENTS 8,805,352 B2 * 8/2014 Mathews ............... H04W 4/023
  455/418
8,805,404 B1 * 8/2014 Yang ...................... H04W 4/02
  455/456.1
(Continued)

FOREIGN PATENT DOCUMENTS

CN  102800002  11/2012
CN  102843645  12/2012
(Continued)

OTHER PUBLICATIONS

Translated Chinese Office Action from corresponding Chinese patent application No. 2014108045316, dated Jun. 4, 2018, 10 pages.
(Continued)

*Primary Examiner* — Melvin H Pollack
(74) *Attorney, Agent, or Firm* — Lee & Hayes, P.C.

(57) ABSTRACT

An information push method comprises: receiving a distance parameter reported by a client terminal; determining whether a distance to the client terminal satisfies a preset distance condition according to the distance parameter; and when the distance to the terminal satisfies any preset distance condition locally, pushing information corresponding to the preset distance condition to the client terminal, wherein different distance conditions correspond to different information locally and respectively. The techniques of the present disclosure respectively push different information to a user based on different distances to client terminals, and adapt to different user application scenarios, thereby improving the user experience.

20 Claims, 5 Drawing Sheets

(58) Field of Classification Search
USPC .................................................. 709/206
See application file for complete search history.

(56) References Cited

U.S. PATENT DOCUMENTS

| | | | | |
|---|---|---|---|---|
| 8,838,477 | B2* | 9/2014 | Moshfeghi | G06Q 20/20 |
| | | | | 705/14.58 |
| 8,989,778 | B2* | 3/2015 | Altman | H04W 4/029 |
| | | | | 455/456.3 |
| 9,003,488 | B2* | 4/2015 | Spencer | H04W 8/22 |
| | | | | 726/3 |
| 9,026,147 | B2* | 5/2015 | Galvin | G01S 19/17 |
| | | | | 455/456.1 |
| 9,042,876 | B2* | 5/2015 | Buck | H04M 1/72569 |
| | | | | 455/418 |
| 9,185,542 | B1* | 11/2015 | Boyle | H04W 4/029 |
| 9,235,839 | B2* | 1/2016 | Dua | G06Q 20/20 |
| 9,244,149 | B2* | 1/2016 | Piersol | H04W 64/003 |
| 9,277,366 | B2* | 3/2016 | Busch | H04W 4/029 |
| 9,294,869 | B2* | 3/2016 | Pang | H04W 76/14 |
| 9,319,149 | B2* | 4/2016 | Luna | H04M 1/7253 |
| 9,445,353 | B2* | 9/2016 | Ullah | H04W 48/16 |
| 9,532,261 | B2* | 12/2016 | Raleigh | H04W 36/245 |
| 9,544,744 | B2* | 1/2017 | Postrel | H04W 4/12 |
| 9,589,269 | B2* | 3/2017 | Henderson | G06Q 20/3224 |
| 9,646,298 | B2* | 5/2017 | Corbalis | H04W 4/029 |
| 9,814,084 | B2* | 11/2017 | Sidhu | H04W 76/10 |
| 9,821,768 | B2* | 11/2017 | Oz | H04L 63/08 |
| 9,918,351 | B2* | 3/2018 | Kim | H04W 4/70 |
| 9,947,004 | B2* | 4/2018 | Shankar | G06Q 20/3224 |
| 10,157,354 | B2* | 12/2018 | Durg | G06Q 10/063114 |
| 10,171,939 | B2* | 1/2019 | Kim | H04W 4/02 |
| 2005/0267816 | A1 | 12/2005 | Jaramillo | |
| 2014/0219118 | A1 | 8/2014 | Middleton et al. | |
| 2014/0249904 | A1* | 9/2014 | Nelsen | G06Q 20/351 |
| | | | | 705/14.23 |
| 2015/0106435 | A1* | 4/2015 | Wang | H04L 67/42 |
| | | | | 709/203 |
| 2015/0111524 | A1 | 4/2015 | South | |
| 2015/0168538 | A1* | 6/2015 | Bradley | G01S 5/0257 |
| | | | | 367/127 |
| 2015/0234868 | A1* | 8/2015 | Lavalaye | H04L 67/18 |
| | | | | 707/812 |
| 2016/0379205 | A1* | 12/2016 | Margadoudakis | G06Q 20/327 |
| | | | | 705/71 |
| 2018/0039975 | A1* | 2/2018 | Hefetz | G06Q 20/3224 |

FOREIGN PATENT DOCUMENTS

| | | |
|---|---|---|
| CN | 102843645 A | 12/2012 |
| CN | 103425659 A | 12/2013 |
| CN | 103686613 | 3/2014 |
| CN | 103781023 A | 5/2014 |
| CN | 103795841 | 5/2014 |
| CN | 103916818 A | 7/2014 |
| CN | 104053128 A | 9/2014 |
| EP | 2750418 A1 | 7/2014 |
| JP | 2014153774 A | 8/2014 |
| WO | WO2008054671 | 5/2008 |

OTHER PUBLICATIONS

Translated Chinese Search Report from corresponding Chinese patent application No. 2014108045316, dated May 23, 2018, 2 pages.
The Extended European Search Report dated Jun. 28, 2018, for European Application No. 15869249.1, 7 pages.
Translation of the International Search Report from corresponding PCT Application No. PCT/CN2015/096799, dated Feb. 29, 2016, 2 pages.
Translation of the Written Opinion from corresponding PCT Application No. PCT/CN2015/096799, dated Feb. 29, 2016, 6 pages.
Hashimoto et al, "iOS Position Information Programming," 1st. ed, Shuwa System Co. LTD, Japan, Mar. 1, 2014, pp. 148-152.
Japanese Office Action dated Apr. 16, 2019 for Japanese Patent Application No. 2017-533010, a counterpart of U.S. Appl. No. 15/624,089, 11 pages.

* cited by examiner

INFORMATION PUSH

CROSS REFERENCE TO RELATED PATENT APPLICATIONS

This application claims priority to and is a continuation of PCT Patent Application No. PCT/CN2015/096799, filed on 9 Dec. 2015, which claims priority to Chinese Patent Application No. 201410804531.6, filed on 19 Dec. 2014, entitled "INFORMATION PUSH METHOD AND DEVICE," which are hereby incorporated by reference in their entirety.

TECHNICAL FIELD

The present disclosure relates to the field of communications, and, in particular, to an information push method and device.

BACKGROUND

With the popularity of portable devices, such as smart phones and tablet computers, intelligent portable terminals have been deeply rooted in people's life. People are eager to have more conveniences in work and life by using portable terminals, especially full online and offline integration.

Based on the above requirement, an information push mechanism is usually used to implement online and offline integration. For example, a service provider may push, by using client software installed on an intelligent portable terminal of a user, some online services in the form of information message to the intelligent portable terminal of the user periodically, thereby implementing full online-offline integration.

However, with the increasingly abundant offline application scenarios of users, the existing information push mechanism cannot meet the requirements of users.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

Accordingly, the present disclosure provides an information push method, applied to a server terminal, the method including:

receiving a distance parameter reported by a client terminal;

determining, according to the distance parameter, whether a distance to the client terminal meets a preset distance condition; and pushing, to the client terminal, information corresponding to the preset distance condition when the distance to the client terminal meets any preset distance condition, wherein different distance conditions correspond to different pieces of information respectively.

For example, the distance to the client terminal refers to a distance from a location of a service provider to a location of the client terminal. For instance, the distance to the client terminal may be a distance from a location of an access point for signals such as WiFi or Bluetooth installed at the location of the service provider, which communicates with the client terminal, to a location of the client terminal.

For example, the server terminal may be installed locally at the service provider, remotely at a cloud server, or reside at both the service provider and the cloud server. For instance, the access point for signals is installed at the location of the service provider.

For example, the information is provided by the service provider. The information may be localized local information provided by the service provider.

Optionally, the method further comprise storing multiple preset distance conditions, different distance conditions in the multiple preset distance conditions corresponding to different pieces of information. For example, the pushing, to the client terminal, information corresponding to the preset distance condition when the distance to the client terminal meets the preset distance condition includes:

pushing, when the distance to the client terminal meets a preset first distance condition, information bound with the preset first distance condition to the client terminal; and pushing, when the distance to the client terminal meets a preset second distance condition, information bound with the preset second distance condition to the client terminal.

Optionally, the distance parameter includes position information reported by the client terminal; the preset distance condition includes a preset first distance condition; and the determining, according to the distance parameter, whether a distance to the client terminal meets a preset distance condition includes:

determining, according to the position information, a distance to the client terminal;

judging whether the distance to the client terminal is less than a preset distance threshold; and determining, when the distance to the client terminal is less than the preset distance threshold, that the distance to the client terminal meets the preset first distance condition.

Optionally, the distance parameter includes a signal strength of a wireless frame acquired by the client terminal that is related to the service provider. For example, when the client terminal acquires a wireless frame of a bound beacon of the server terminal, the distance parameter includes signal strength of the latest wireless frame of the bound beacon acquired by the client terminal; and the preset distance condition includes a preset second distance condition; and the determining, according to the distance parameter, whether a distance to the client terminal meets a preset distance condition includes:

judging whether the signal strength is higher than a preset first signal strength threshold; and determining, when the signal strength is higher than the first signal strength threshold, that the distance to the client terminal meets the preset second distance condition.

Optionally, the pushing to the client terminal information corresponding to the preset distance condition when the distance to the client terminal meets any preset distance condition includes:

pushing, when the distance to the client terminal meets the preset first distance condition, information bound with the first distance condition to the client terminal; and receiving, when the distance to the client terminal meets the preset second distance condition, a beacon identification uploaded by the client terminal, and pushing information bound with the beacon identification to the client terminal.

Optionally, the method further includes:

judging whether the signal strength is higher than a preset second signal strength threshold, wherein the second signal strength threshold is higher than the first signal strength threshold; and enabling user behavior verification when the signal strength is higher than the second signal strength threshold, and performing, after the user behavior verification succeeds, a service process corresponding to the current user behavior verification.

Optionally, the bound beacon is a Bluetooth beacon, and the wireless frame is a Beacon frame.

Optionally, the distance parameter includes position information reported by the client terminal and a signal strength of a wireless frame acquired by the client terminal that is related to a service provider. The preset distance condition includes a preset first distance condition and a preset second distance condition. For example, the determining, according to the distance parameter, whether the distance to the client terminal meets the preset distance condition includes:

determining, according to the position information, the distance to the client terminal;

judging whether the distance to the client terminal is less than a preset distance threshold;

determining, when the distance to the client terminal is less than the preset distance threshold, that the distance to the client terminal meets the preset first distance condition.

judging whether the signal strength is higher than a preset first signal strength threshold; and determining, when the signal strength is higher than the first signal strength threshold, that the distance to the client terminal meets the preset second distance condition.

For example, the pushing, to the client terminal, information corresponding to the preset distance condition when the distance to the client terminal meets the preset distance condition includes:

pushing, when the distance to the client terminal meets the preset first distance condition, information bound with the preset first distance condition to the client terminal; and receiving, when the distance to the client terminal meets the preset second distance condition, a beacon identification of the wireless frame uploaded by the client terminal and pushing information bound with the beacon identification to the client terminal.

The present disclosure further provides an information push device, applied to a server terminal, the device including:

a receiving module configured to receive a distance parameter reported by a client terminal;

a determination module configured to determine, according to the distance parameter, whether a distance to the client terminal meets a preset distance condition; and a push module configured to push, to the client terminal, information corresponding to the preset distance condition when the distance to the client terminal meets any preset distance condition locally, wherein different distance conditions correspond to different pieces of information locally and respectively.

Optionally, the distance parameter includes position information reported by the client terminal; the preset distance condition includes a preset first distance condition; and the determination module is, for example, configured to:
determine, according to the position information, a distance to the client terminal;
judge whether the distance to the client terminal is less than a preset distance threshold; and
determine, when the distance to the client terminal is less than the preset distance threshold, that the distance to the client terminal meets the preset first distance condition.

Optionally, when the client terminal acquires a wireless frame of a bound beacon of the server terminal, the distance parameter includes signal strength of the latest wireless frame of the bound beacon acquired by the client terminal; the preset distance condition includes a preset second distance condition; and the determination module is further configured to:
judge whether the signal strength is higher than a preset first signal strength threshold; and
determine, when the signal strength is higher than the first signal strength threshold, that the distance to the client terminal meets the preset second distance condition.

Optionally, the push module is, for example, configured to:
push, when the distance to the client terminal meets the preset first distance condition, information bound with the first distance condition to the client terminal; and
receive, when the distance to the client terminal meets the preset second distance condition, a beacon identification uploaded by the client terminal, and push information bound with the beacon identification to the client terminal.

Optionally, the determination module is further configured to:
judge whether the signal strength is higher than a preset second signal strength threshold; wherein the second signal strength threshold is higher than the first signal strength threshold; and
enable user behavior verification when the signal strength is higher than the second signal strength threshold, and perform, after the user behavior verification succeeds, a service process corresponding to the current user behavior verification.

Optionally, the bound beacon is a Bluetooth beacon, and the wireless frame is a Beacon frame.

The present disclosure further provides an information push device, including:

a processor; and a memory configured to store instructions executable by the processor, wherein the processor is configured to:
receive a distance parameter reported by a client terminal;
determine, according to the distance parameter, whether a distance to the client terminal meets a preset distance condition; and
push, to the client terminal, information corresponding to the preset distance condition when the distance to the client terminal meets any preset distance condition locally, wherein different distance conditions correspond to different pieces of information locally and respectively.

The present disclosure further provides a device comprising:
one or more processors; and
one or more memories stored thereon computer-readable instructions that, when executed by the one or more processors, cause the one or more processors to perform acts comprising:
receiving a distance parameter reported by a client terminal;
determining, according to the distance parameter, whether a distance to the client terminal meets a preset distance condition; and
pushing, to the client terminal, information corresponding to the preset distance condition when the distance to the client terminal meets the preset distance condition.

For example, the acts further comprise storing multiple preset distance conditions, different distance conditions in the multiple preset distance conditions corresponding to different pieces of information.

For example, the distance parameter includes position information reported by the client terminal; the preset distance condition includes a preset first distance condition; and the determining, according to the distance parameter, whether the distance to the client terminal meets the preset distance condition includes:

determining, according to the position information, the distance to the client terminal;

judging whether the distance to the client terminal is less than a preset distance threshold; and determining, when the distance to the client terminal is less than the preset distance threshold, that the distance to the client terminal meets the preset first distance condition.

For example, when the client terminal acquires a wireless frame of a bound beacon of the server terminal, the distance parameter includes signal strength of a wireless frame of a bound beacon acquired by the client terminal and the preset distance condition includes a preset second distance condition; and the determining, according to the distance parameter, whether the distance to the client terminal meets the preset distance condition includes:

judging whether the signal strength is higher than a preset first signal strength threshold; and determine, when the signal strength is higher than the first signal strength threshold, that the distance to the client terminal meets the preset second distance condition.

For example, the acts may further comprise:

judging whether the signal strength is higher than a preset second signal strength threshold, wherein the second signal strength threshold is higher than the first signal strength threshold;

enabling a user behavior verification when the signal strength is higher than the second signal strength threshold; and performing, after the user behavior verification succeeds, a service process corresponding to the user behavior verification.

For example, the wireless frame is a Beacon frame.

The present disclosure further provides one or more memories stored thereon computer-readable instructions that, when executed by one or more processors, cause the one or more processors to perform acts comprising:

receiving a distance parameter reported by a client terminal;

determining, according to the distance parameter, whether a distance to the client terminal meets a preset distance condition; and pushing, to the client terminal, information corresponding to the preset distance condition when the distance to the client terminal meets the preset distance condition.

The features of the above embodiments may be referenced to each other.

The present disclosure, by receiving a distance parameter reported by a client terminal and determining, according to the distance parameter, whether a distance to the client terminal meets a preset distance condition, pushes information corresponding to the preset distance condition to the client terminal when the distance to the client terminal meets any preset distance condition, thereby pushing different pieces of information to users respectively on the basis of different distances to terminals of the users, being adaptive to different user application scenarios, and improving user experience.

DETAILED DESCRIPTION

Example embodiments will be described in detail herein, and examples thereof are shown in the accompanying drawings. When the following description involves the accompanying FIGs, the same numerals in different accompanying FIGs denote the same or similar elements, unless specified otherwise. Implementations described in the following example embodiments do not represent all implementations complying with the present disclosure. On the contrary, the described embodiments are merely examples of devices and methods that comply with some aspects of the present disclosure and are described in detail in the appended claims.

Terms used in the present disclosure are merely for describing specific embodiments, instead of limiting the present disclosure. Singular forms "a (an)", "said", and "the" used in the present disclosure and the appended claims also include plural forms, unless other meanings are clearly specified in the context. It should be further understood that, the term "and/or" used in this text refers to and includes any or all possible combinations of one or more associated items listed.

It should be understood that although terms such as "first", "second", and "third" may be used to describe various kinds of information in the present disclosure, these kinds of information should not be limited to the terms. These terms are merely used to distinguish information of the same type from each other. For example, without departing from the scope of the present disclosure, the first information may also be referred to as second information, and similarly the second information may also be referred to as first information. Depending on the context, the word "if" used herein may be explained as "when . . . ", "as . . . ", or "in response to the determination".

The present disclosure is described in the following by using specific embodiments in combination with specific application scenarios.

Figure 1:
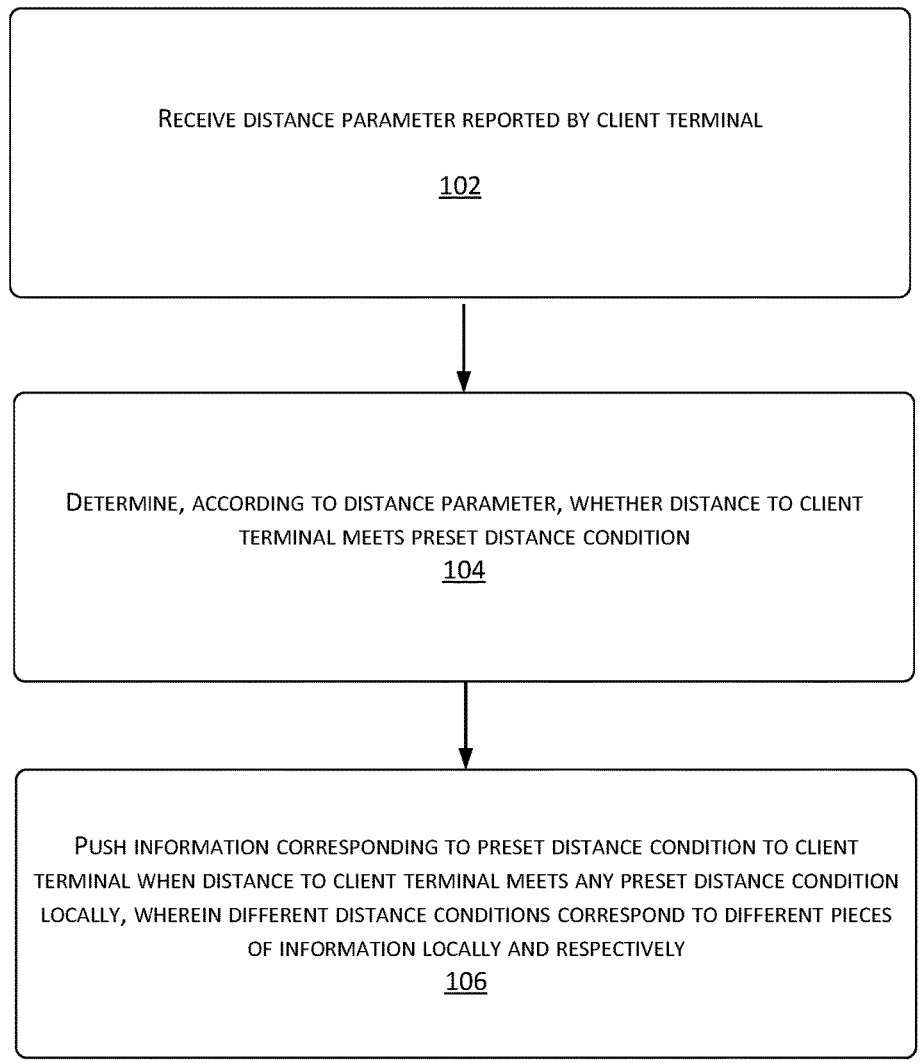
FIG. 1 is a flowchart of an information push method according to an embodiment of the present disclosure.

Referring to FIG. 1, FIG. 1 is an information push method according to an embodiment of the present disclosure. The method may be executed by a server terminal. The server terminal may be an application server, and the method includes the following steps:

Step 102, a distance parameter reported by a client terminal is received;

Step 104, according to the distance parameter, whether a distance to the client terminal meets a preset distance condition is determined; and Step 106, information corresponding to the preset distance condition is pushed to the client terminal when the distance to the client terminal meets any preset distance condition locally, wherein different distance conditions correspond to different pieces of information locally and respectively.

In this embodiment, specific content of the distance parameter may depend on an actual application scenario. That is, in different application scenarios, distance parameters reported by the client terminal to the server terminal may be different. During implementation, the distance parameter may be or may not be a physical distance parameter in the strict sense.

For example, in an application scenario where a distance between the client terminal and a service provider is relatively far, when a user carrying the client terminal continuously approaches the service provider (such as a hotel or a cinema), a server terminal of the service provider may remotely position an actual distance to the client terminal based on a GPS positioning function. Therefore, in this application scenario, the client terminal may acquire a current position by using a pre-loaded GPS positioning function, then use the acquired current position as the distance parameter, and report the distance parameter to the server terminal of the service provider by using authorized client software that is installed locally and used cooperatively with the server terminal. In this case, the distance parameter is a physical distance parameter in the strict sense. The client software may be client software independently developed by the service provider with respect to implementation. For example, the client software may be mobile phone client software of the hotel or the cinema.

In an application scenario where the client terminal is relatively close to the service provider, for example, when the user carrying the client terminal enters a service range of the service provider (such that the user carries the client terminal enters a hall or lobby of the hotel or cinema), the server terminal of the service provider may position a distance to the user terminal on the basis of signal strength of a wireless frame, received by the client terminal, of a beacon bound to the server terminal. Therefore, in this application scenario, the distance parameter is not a physical distance parameter in the strict sense. When the client terminal detects the wireless frame of the beacon bound to the server terminal, the client terminal may report, by using the locally installed client software that is used cooperatively with the server terminal, the signal strength of the received wireless frame to the server terminal.

Figure 2:
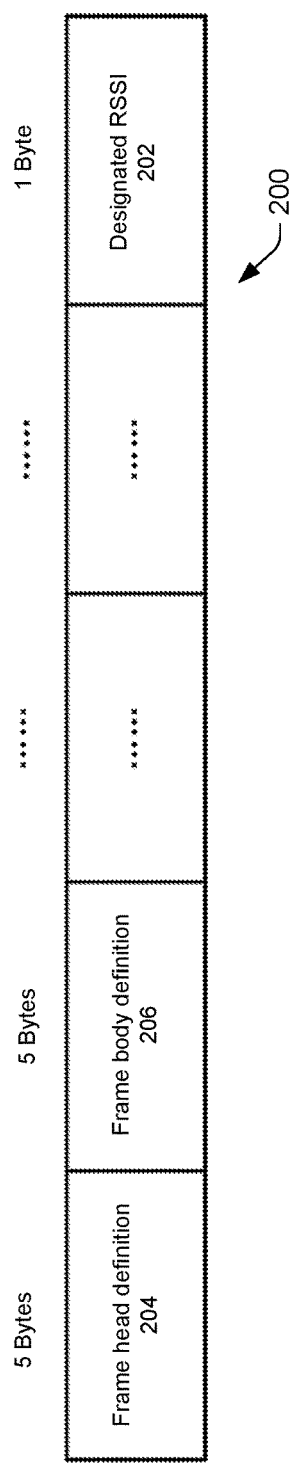
FIG. 2 is a structural diagram of a wireless frame according to an embodiment of the present disclosure.

For example, the service provider being a hotel is used as an example, and the beacon may be a Bluetooth beacon installed in a lobby of the hotel. When the user carrying the client terminal enters a signal coverage of the Bluetooth beacon, and receives a Beacon frame broadcast by the Bluetooth beacon, the user may acquire, from a designated location of the received Beacon frame, received signal strength index (e.g., RSSI) of the wireless frame by using a built-in Bluetooth driver, and then report the acquired signal strength of the latest Beacon frame to a server of the hotel by using locally installed hotel client software that is used cooperatively with the server terminal. Wherein, beacons with different specifications may have different designated signal strength carried at a designated location of the Beacon frame. For example, please refer to a format example of a Beacon frame 200 shown in FIG. 2, wherein a designated RSSI 202 occupies a length of one byte at a reserved location of the Beacon frame, and at this location, the corresponding signal strength may be filled, such as 0x2B or 0x3C, which may be configured by an owner or a developer of the Bluetooth beacon as required. In FIG. 2, the Beacon frame also includes a frame head definition 204 and a frame body definition 206, each occupying 5 bytes.

In this embodiment, after receiving the distance parameter reported by the client terminal, the server terminal may determine, according to the distance parameter, a distance to the client terminal, and judge whether the distance meets a preset distance condition. The preset distance condition may still include different content in different application scenarios.

Detailed illustrations are made in combination with different application scenarios in the following.

Application Scenario 1:

In an application scenario where a client terminal is relatively far away from a service provider, as described above, in this case, a distance parameter reported by the client terminal is position information after positioning by using a local GPS, and the server terminal, after receiving the distance parameter, may determine a distance to the client terminal according to the position information of the client terminal in combination with position information of the server terminal itself. For example, the server terminal may also acquire position information thereof by using GPS positioning, and then calculate a distance between the position of the server terminal and a position of the client terminal.

Figure 3:
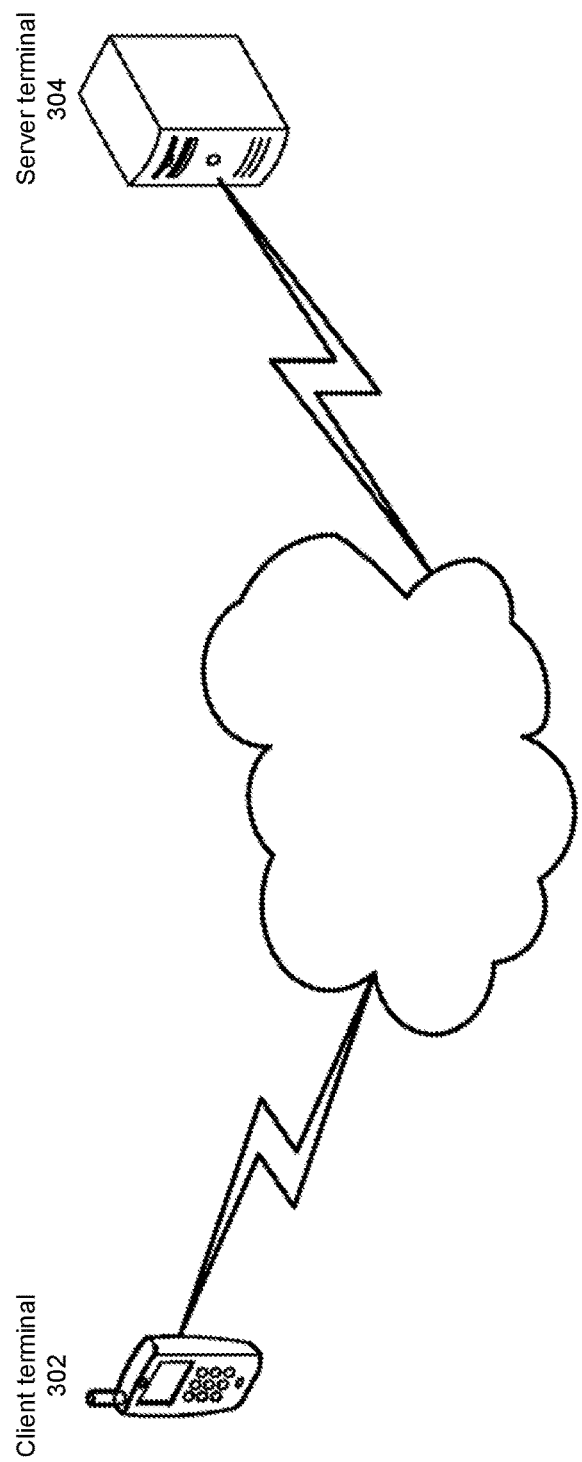
FIG. 3 is a general system scenario diagram of an implementation according to an embodiment of the present disclosure.

Please refer to a schematic diagram of the application scenario shown in FIG. 3. As shown in FIG. 3, the application scenario generally includes a client terminal 302 such as a portable terminal and a server terminal 304 such as an application server, wherein the portable terminal and the application server both support the GPS positioning function. The portable terminal may be a mobile phone, a tablet computer, a personal digital assistant, and other portable computing devices.

In the application scenario, the preset distance condition may include a first distance condition. The first distance condition may be a preset distance threshold, and in this case, the server terminal may judge whether the distance to the client terminal is less than the distance threshold, and, if the distance is less than the distance threshold, determine that the distance to the client terminal meets the preset first distance condition, and push, to the client terminal, information locally bound with the first distance condition.

For example, the service provider being a hotel is used as an example, and the distance threshold may be set to 1 kilometer. In a process that a user carrying a client terminal continuously approaches the hotel, when a server terminal of the hotel judges that a distance to the client terminal is less than 1 kilometer, it may determine that the distance to the client terminal meets the first distance condition, and start to push, to the client terminal, information locally bound with the first distance condition. In in the application scenario, the information bound for the first distance condition may include online service information such as introduction of the hotel, couponing, and information about navigation to the hotel.

Certainly, during implementation, the pushed information may be further subdivided by setting multiple distance thresholds in the application scenario. For example, the service provider being the hotel is still used as an example, and a first distance threshold of 1 kilometer, a second distance threshold of 500 meters, and a third distance threshold of 300 meters may be set. When the server terminal of the hotel judges that the distance to the client terminal is less than 1 kilometer, the server terminal may push, to the client terminal, information about navigation to the hotel. When the server terminal of the hotel judges that the distance to the client terminal is less than 500 meters, the server terminal may push and provide a coupon to the client terminal. When the server terminal of the hotel judges that the distance to the client terminal is less than 300 meters, the server terminal may push introduction information of the hotel to the server terminal, which is not described in detail.

Application Scenario 2:

In an application scenario where a client terminal is relatively close to a service provider, as described above, in this case, the distance parameter reported by the client terminal may be received signal strength of the latest wireless frame, acquired by the client terminal, of a bound beacon of the server terminal, and the server terminal may determine, according to the received signal strength, a distance to the client terminal.

Figure 4:
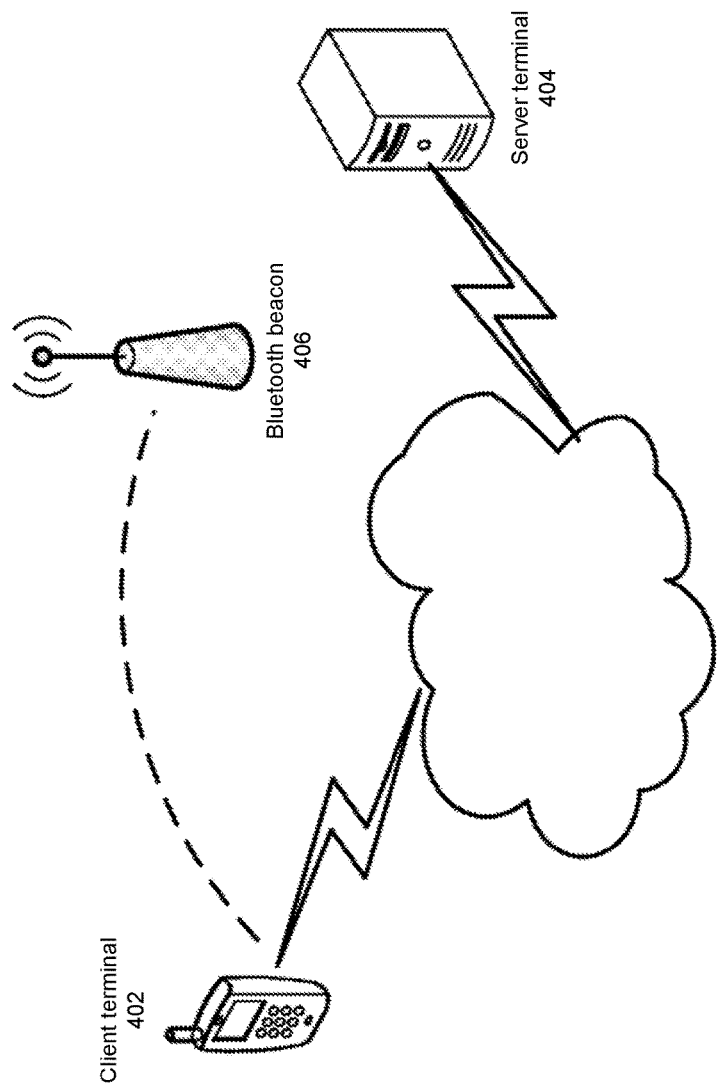
FIG. 4 is another general system scenario diagram of an implementation according to an embodiment of the present disclosure.

Please refer to a schematic diagram of the application scenario shown in FIG. 4. As shown in FIG. 4, the application scenario generally includes a client terminal 402 such as a portable terminal, a server terminal 404 such as an application server, and an access point such as a wireless beacon or Bluetooth beacon 406 bound to the application server. The portable terminal may be a mobile phone, a tablet computer, a personal digital assistant, and other portable computing devices. The wireless beacon may be various wireless beacons supporting short-distance wireless technologies, for example, a Bluetooth beacon.

Generally, the received signal strength may well represent, in a reverse way, a physical distance between a receiver (the client terminal) and a sender (the beacon). In other words, the closer the distance between the receiver and the sender is, the stronger the received signal strength at the side of the receiver is.

Therefore, in the application scenario, the preset distance condition may include a second distance condition. The second distance condition may be a preset signal strength threshold, and in this case, the server terminal may judge whether the received signal strength reported by the client terminal is higher than the signal strength threshold, and if the received signal strength is higher than the signal strength threshold, determine that the distance to the client terminal meets the preset second distance condition, and the server terminal may push, to the client terminal, information bound to an access beacon of the client terminal.

For example, an information provider being a hotel is used as an example, and a developer of the hotel may acquire a designated signal strength in advance according to an empirical value, and the signal strength corresponds to a physical distance, e.g., 5 m. When an information end of the hotel judges that the received signal strength reported by the client terminal is greater than the designated signal strength, which indicates that the physical distance between the client terminal and the beacon is generally less than or equal to 5 m, the information end may determine that the distance to the client terminal meets the second distance condition, and starts to push, to the client terminal, information bound to the access beacon of the client terminal. In the application scenario, the information bound to the access beacon of the client terminal may be online service information such as a welcome message, verification of a coupon, approach payment, and check-in.

In the application scenario, the pushed information may be further subdivided into far-field information and near-field information by setting multiple signal distance thresholds, for example, setting a higher signal threshold and a lower signal threshold.

For example, the service provider being the hotel and the wireless beacon being the Bluetooth beacon are still used as an example, the signal strength when a distance to the Bluetooth beacon is 10 meters may be set as the first signal strength, and the signal strength when a distance to the Bluetooth beacon is 0.1 meter or other signal strength sufficient to meet near-field service requirements is set as the second signal strength. When a user carrying a client terminal enters a hall of the hotel and enters a signal coverage of the Bluetooth beacon disposed at a hotel reception, the client terminal receives a Beacon frame broadcast by the Bluetooth beacon. At this point, the client terminal may acquire, by using a built-in Bluetooth driver, the received signal strength of the wireless frame from a designated location of the received Beacon frame, then report, to a server terminal of the hotel, the acquired signal strength and an acquired beacon identification of the Bluetooth beacon. When the server terminal judges, according to the signal strength reported by the client terminal, that a distance between the client terminal and the Bluetooth beacon is less than 10 meters, the server terminal may push, to the client terminal, a far-field service, such as a welcome, bound to the beacon identification of the Bluetooth beacon.

If the user, after entering the hotel, continuously approaches the Bluetooth beacon at the reception, when the server terminal of the hotel judges, according to the signal strength reported by the client terminal, that the distance between the client terminal and the Bluetooth beacon is less than 0.1 meter, the distance between the client terminal and the Bluetooth beacon has met requirements of near-field services. At this point, user behavior verification may be enabled, and after the user behavior verification succeeds, service processes, such as verification of a coupon, approach payment, and check-in, corresponding to the current user behavior verification are performed, thus completing an operation similar to "swiping the mobile phone".

The user behavior verification process may be a process of matching information reserved by the user with reserved information stored in the server terminal of the hotel. For example, when using hotel client software that is used cooperatively with the server terminal of the hotel, the user may upload, by using a configuration interface of the hotel client software, various types of personal information to the server terminal of the hotel for storage. For example, when the user needs to complete near-field payment by using the above operation of "swiping the mobile phone", the personal information may include information such as a payment account and a payment check code. When the user needs to complete verification of a coupon by using the above operation of "swiping the mobile phone", the personal information may include information such as a number of the coupon, and a check code of the coupon. When the user needs to complete check-in by using the above operation of "swiping the mobile phone", the personal information may include a scanned image (or photo) of an identity card required for check-in of the user, ID number, mobile phone number, company name, gender, name, invoice title, or even credit card information (for completing check-in pre-authorization). When the server terminal of the hotel judges that the distance between the client terminal and the Bluetooth beacon is less than 0.1 meter, the server terminal may match personal information in the hotel client on the client terminal with personal information stored in the server terminal, and if the two pieces of information are consistent, the user may complete a corresponding service process, such as near-field payment, verification of a coupon, or check-in, by this operation of "swiping the mobile phone".

In the above embodiment, by receiving a distance parameter reported by a client terminal, and determining, according to the distance parameter, whether a distance to the client terminal meets a preset distance condition, a service corresponding to the preset distance condition is pushed to the client terminal when the distance to the client terminal meets any preset distance condition, thereby pushing different services to users respectively on the basis of different distances to terminals of the users, being adaptive to different user application scenarios, and improving user experience.

Figure 5:
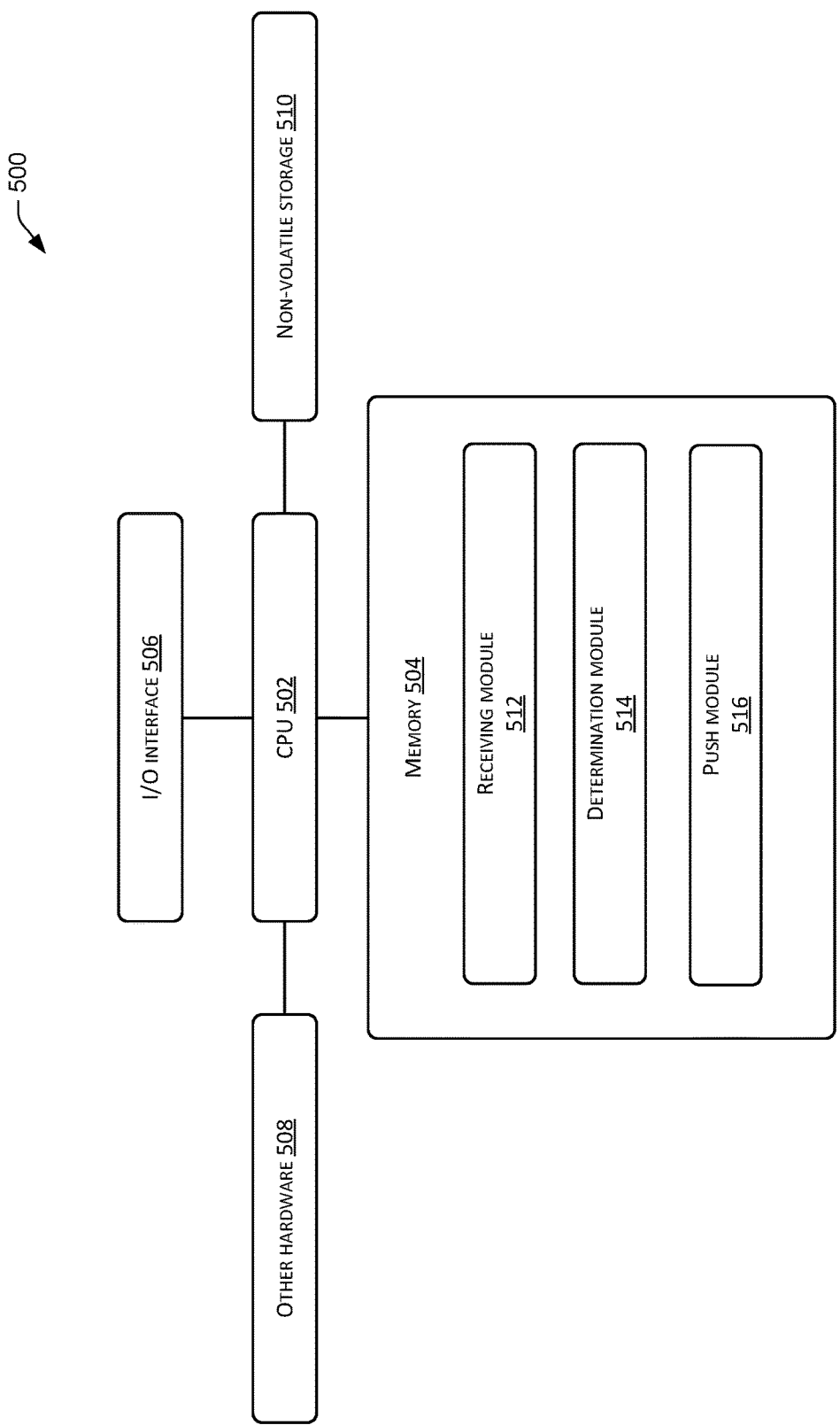
FIG. 5 is a schematic structural diagram of logic structure of an information push device according to an embodiment of the present disclosure.

Corresponding to the method embodiment, the present disclosure further provides an embodiment of an information push device. By using software implementation as an example, the device may run on a server. As a running carrier of the device of the present disclosure, the server generally includes at least a CPU, a memory, and a non-volatile storage, and may further include hardware such as an I/O interface. Referring to FIG. 5, FIG. 5 is a schematic diagram of a logical structure of a service push device according to an example embodiment of the present disclosure.

The device 500 includes one or more processor(s) 502 or data processing unit(s) and memory 504. The device 500 may further include one or more input/output interface(s) 506, other hardware 508 such as network interface(s), and non-volatile storage 510. The memory 504 is an example of computer readable media.

The computer readable media include volatile and non-volatile, removable and non-removable media, and can use any method or technology to store information. The information may be a computer readable instruction, a data structure, and a module of a program or other data. Examples of storage media of a computer include, but are not limited to, a phase change memory (PRAM), a static random access memory (SRAM), a dynamic random access memory (DRAM), other types of RAMs, an ROM, an electrically erasable programmable read-only memory (EEPROM), a flash memory or other memory technologies, a compact disk read-only memory (CD-ROM), a digital versatile disc (DVD) or other optical storage, a cassette tape, a tape disk storage or other magnetic storage devices, or any other non-transmission media, which can be that storing information accessible to a computation device. According to the definition herein, the computer readable media does not include transitory computer readable media (transitory media), for example, a modulated data signal and a carrier.

The memory 404 may store therein a plurality of modules or units including:

a receiving module 512 configured to receive a distance parameter reported by a client terminal;

a determination module 514 configured to determine, according to the distance parameter, whether a distance to the client terminal meets a preset distance condition; and a push module 516 configured to push, to the client terminal, information corresponding to the preset distance condition when the distance to the client terminal meets any preset distance condition locally, wherein different distance conditions correspond to different pieces of information locally and respectively.

In this embodiment, the distance parameter includes position information reported by the client terminal; the position information is obtained by the client terminal by using GPS positioning; and the preset distance condition includes a preset first distance condition.

The determination module 514 is, for example, configured to:

determine, according to the position information, a distance to the client terminal;

judge whether the distance to the client terminal is less than a preset distance threshold; and determine, when the distance to the client terminal is less than the preset distance threshold, that the distance to the client terminal meets the preset first distance condition.

In this embodiment, when the client terminal acquires a wireless frame of a bound beacon of the server terminal, the distance parameter includes signal strength of the latest wireless frame of the bound beacon acquired by the client terminal; the preset distance condition includes a preset second distance condition; and the determination module 514 is further configured to:

judge whether the signal strength is higher than a preset first signal strength threshold; and determine, when the signal strength is higher than the first signal strength threshold, that the distance to the client terminal meets the preset second distance condition.

In this embodiment, the push module 516 is, for example, configured to:

push, when the distance to the client terminal meets the preset first distance condition, information bound with the first distance condition to the client terminal; and receive, when the distance to the client terminal meets the preset second distance condition, a beacon identification uploaded by the client terminal, and push information bound with the beacon identification to the client terminal.

In this embodiment, the determination module 514 is further configured to:

judge whether the signal strength is higher than a preset second signal strength threshold, wherein the second signal strength threshold is higher than the first signal strength threshold; and enable user behavior verification when the signal strength is higher than the second signal strength threshold, and perform, after the user behavior verification succeeds, a service process corresponding to the current user behavior verification.

In this embodiment, the bound beacon is a Bluetooth beacon, and the wireless frame is a Beacon frame.

The present disclosure further provides an embodiment of a server.

The server includes: a processor, and a memory configured to store instructions executable by the processor.

Further, the server may include an input/output interface, a network interface, various hardware, and the like.

The server may be configured to:

receive a distance parameter reported by a client terminal;

determine, according to the distance parameter, whether a distance to the client terminal meets a preset distance condition; and push, to the client terminal, information corresponding to the preset distance condition when the distance to the client terminal meets any preset distance condition locally, wherein different distance conditions correspond to different pieces of information locally and respectively.

Those skilled in the art may easily find other implementations of the present disclosure after considering the specification and practicing the techniques of the present disclosure disclosed here. The present disclosure is intended to cover any variations, usages, or adaptive changes of the present disclosure, and these variations, usages or adaptive changes follow general principles of the present disclosure and include common general knowledge or conventional technical measures in the technical field that are not disclosed in the present disclosure. The specification and embodiments are considered as merely exemplary, and the real scope and spirit of the present disclosure are defined by the following claims.

It should be understood that the present disclosure is not limited to precise structures that have been described above and shown in the accompanying drawings, and may have various modifications and variations without departing from the spirit thereof. The scope of the present disclosure is merely limited by the appended claims.

The above descriptions are merely example embodiments of the present disclosure, and are not intended to limit the present disclosure. Any modification, equivalent replacement and improvement made without departing from the spirit and principle of the present disclosure shall fall within the protection scope of the present disclosure.

The invention claimed is:

1. A method comprising:
receiving a distance parameter of a client terminal;
determining, according to the distance parameter, whether a distance between a location of a service provider and a location of the client terminal meets a preset distance condition; and
pushing, to the client terminal, information corresponding to the preset distance condition when the distance between the location of the service provider and the location of the client terminal meets the preset distance condition, wherein different pieces of information are pushed to the client terminal when the distance between the location of the service provider and the location of the client terminal is different.

2. The method of claim 1, wherein the information is related to a service provider.

3. The method of claim 1, further comprising:
storing multiple preset distance conditions, different distance conditions in the multiple preset distance conditions corresponding to the different pieces of information.

4. The method of claim 3, wherein the pushing, to the client terminal, information corresponding to the preset distance condition when the distance between the location of the service provider and the location of the client terminal meets the preset distance condition includes:
pushing, when the distance between the location of the service provider and the location of the client terminal meets a preset first distance condition, information bound with the preset first distance condition to the client terminal; and
pushing, when the distance between the location of the service provider and the location of the client terminal meets a preset second distance condition, information bound with the preset second distance condition to the client terminal.

5. The method of claim 1, wherein the distance parameter includes position information reported by the client terminal.

6. The method of claim 5, wherein:
the preset distance condition includes a preset first distance condition; and
the determining, according to the distance parameter, whether the distance between the location of the service provider and the location of the client terminal meets the preset distance condition includes:
determining, according to the position information, the distance between the location of the service provider and the location of the client terminal;
judging whether the distance between the location of the service provider and the location of the client terminal is less than a preset distance threshold; and
determining, when the distance between the location of the service provider and the location of the client terminal is less than the preset distance threshold, that the distance between the location of the service provider and the location of the client terminal meets the preset first distance condition.

7. The method of claim 1, wherein the distance parameter includes a signal strength of a wireless frame acquired by the client terminal that is related to the service provider.

8. The method of claim 7, wherein:
the preset distance condition includes a preset second distance condition; and
the determining, according to the distance parameter, whether the distance between the location of the service provider and the location of the client terminal meets a preset distance condition includes:
judging whether the signal strength is higher than a preset first signal strength threshold; and
determining, when the signal strength is higher than the first signal strength threshold, that the distance between the location of the service provider and the location of the client terminal meets the preset second distance condition.

9. The method of claim 1, wherein the distance parameter includes position information reported by the client terminal and a signal strength of a wireless frame acquired by the client terminal that is related to the service provider.

10. The method of claim 1, wherein:
the preset distance condition includes a preset first distance condition and a preset second distance condition; and
the determining, according to the distance parameter, whether the distance between the location of the service provider and the location of the client terminal meets the preset distance condition includes:
determining, according to the position information, the distance between the location of the service provider and the location of the client terminal;
judging whether the distance between the location of the service provider and the location of the client terminal is less than a preset distance threshold;
determining, when the distance between the location of the service provider and the location of the client terminal is less than the preset distance threshold, that the distance between the location of the service provider and the location of the client terminal meets the preset first distance condition;
judging whether the signal strength is higher than a preset first signal strength threshold; and
determining, when the signal strength is higher than the first signal strength threshold, that the distance between the location of the service provider and the location of the client terminal meets the preset second distance condition.

11. The method of claim 10, wherein the pushing, to the client terminal, information corresponding to the preset distance condition when the distance between the location of the service provider and the location of the client terminal meets the preset distance condition includes:
pushing, when the distance between the location of the service provider and the location of the client terminal meets the preset first distance condition, information bound with the preset first distance condition to the client terminal; and receiving, when the distance between the location of the service provider and the location of the client terminal meets the preset second distance condition, a beacon identification of the wireless frame uploaded by the client terminal and pushing information bound with the beacon identification to the client terminal.

12. The method of claim 11, wherein the wireless frame is a Beacon frame.

13. The method of claim 10, further comprising:
judging whether the signal strength is higher than a preset second signal strength threshold, wherein the second signal strength threshold is higher than the first signal strength threshold;
enabling a user behavior verification when the signal strength is higher than the second signal strength threshold; and
performing, after the user behavior verification succeeds, a service process corresponding to the user behavior verification.

14. A device comprising:
one or more processors; and
one or more memories stored thereon computer-readable instructions that, when executed by the one or more processors, cause the one or more processors to perform acts comprising:
receiving a distance parameter reported by a client terminal;
determining, according to the distance parameter, whether a distance between a location of a service provider and a location of the client terminal meets a preset distance condition; and
pushing, to the client terminal, information corresponding to the preset distance condition when the distance between the location of the service provider and the location of the client terminal meets the preset distance condition, wherein different pieces of information are pushed to the client terminal when the distance between the location of the service provider and the location of the client terminal is different.

15. The device of claim 14, wherein the acts further comprise:
storing multiple preset distance conditions, different distance conditions in the multiple preset distance conditions corresponding to the different pieces of information.

16. The device of claim 14, wherein:
the distance parameter includes position information reported by the client terminal;
the preset distance condition includes a preset first distance condition; and
the determining, according to the distance parameter, whether the distance between the location of the service provider and the location of the client terminal meets the preset distance condition includes:
determining, according to the position information, the distance between the location of the service provider and the location of the client terminal;
judging whether the distance between the location of the service provider and the location of the client terminal is less than a preset distance threshold; and
determining, when the distance between the location of the service provider and the location of the client terminal is less than the preset distance threshold, that the distance between the location of the service provider and the location of the client terminal meets the preset first distance condition.

17. The device of claim 14, wherein:
when the client terminal acquires a wireless frame of a bound beacon of the provider server, the distance parameter includes signal strength of a wireless frame of a bound beacon acquired by the client terminal and the preset distance condition includes a preset second distance condition; and
the determining, according to the distance parameter, whether the distance between the location of the service provider and the location of the client terminal meets the preset distance condition includes:
judging whether the signal strength is higher than a preset first signal strength threshold; and
determining, when the signal strength is higher than the first signal strength threshold, that the distance between the location of the service provider and the location of the client terminal meets the preset second distance condition.

18. The device of claim 17, wherein the acts further comprise:
judging whether the signal strength is higher than a preset second signal strength threshold, wherein the second signal strength threshold is higher than the first signal strength threshold;
enabling a user behavior verification when the signal strength is higher than the second signal strength threshold; and
performing, after the user behavior verification succeeds, a service process corresponding to the user behavior verification.

19. The device of claim 17, wherein the wireless frame is a Beacon frame.

20. One or more memories stored thereon computer-readable instructions that, when executed by one or more processors, cause the one or more processors to perform acts comprising:
receiving a distance parameter reported by a client terminal;
determining, according to the distance parameter, whether a distance between a location of a service provider and a location of the client terminal meets a preset distance condition; and
pushing, to the client terminal, information corresponding to the preset distance condition when the distance between the location of the service provider and the location of the client terminal meets the preset distance condition, wherein different pieces of information are pushed to the client terminal when the distance between the location of the service provider and the location of the client terminal is different.

* * * * *